United States Patent

[11] 3,536,183

| [72] | Inventor | John A. Locke |
| | | Glendale, California |
| [21] | Appl. No. | 690,909 |
| [22] | Filed | Dec. 15, 1967 |
| [45] | Patented | Oct. 27, 1970 |
| [73] | Assignee | General Host Corporation |
| | | New York, New York |
| | | a corporation of New York |

[54] CHAIN BELT CONVEYOR SYSTEM
8 Claims, 15 Drawing Figs.

| [52] | U.S. Cl. | 198/136, 198/203 |
| [51] | Int. Cl. | B65g 15/00, B65g 23/00 |
| [50] | Field of Search | 198/136, 181, 195, 208, 203, 232 |

[56] References Cited
UNITED STATES PATENTS

| 1,728,283 | 9/1929 | Fisher | 198/232 |
| 2,658,610 | 11/1953 | Winslow | 198/232 |
| 2,760,623 | 8/1956 | Thomson | 198/208 |
| 3,225,898 | 12/1965 | Roinestad | 198/182 |
| 3,358,811 | 12/1967 | Gerrish | 198/182 |
| 1,226,730 | 5/1917 | Weston | 198/136 |
| 2,725,976 | 12/1955 | Madeira | 198/208 |
| 3,054,499 | 9/1962 | Petix | 198/208 |
| 3,348,659 | 10/1967 | Roinestad | 198/136 |
| 3,399,789 | 9/1968 | Forst | 198/136 |

FOREIGN PATENTS

| 590,625 | 7/1947 | Great Britain | 198/208 |

*Primary Examiner*—Richard E. Aegerter
*Attorney*—Perry E. Turner

ABSTRACT: An endless loop conveyor formed of chain belt has spaced differentials for driving sprockets that are carried on separate shafts and engage the ends of rods that form the chain links. The differentials, which are driven from a common motor shaft, compensate for differences in stretch and wear in the edges and in different sections of the belt, to the end that the belt moves smoothly and does not bind. In addition, each sprocket drive includes a pair of movable sprockets coupled to a weight, to aid in compensating for slack and for differences in wear reflected in age and use of different sections of the belt.

Patented Oct. 27, 1970
3,536,183
Sheet 1 of 4
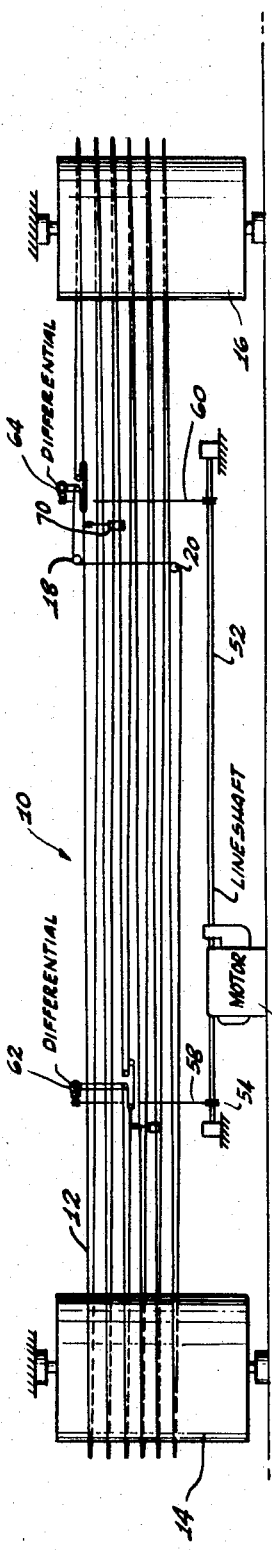
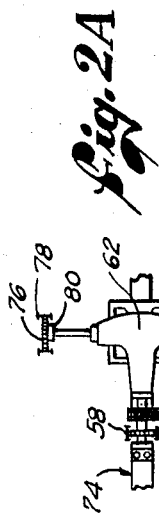
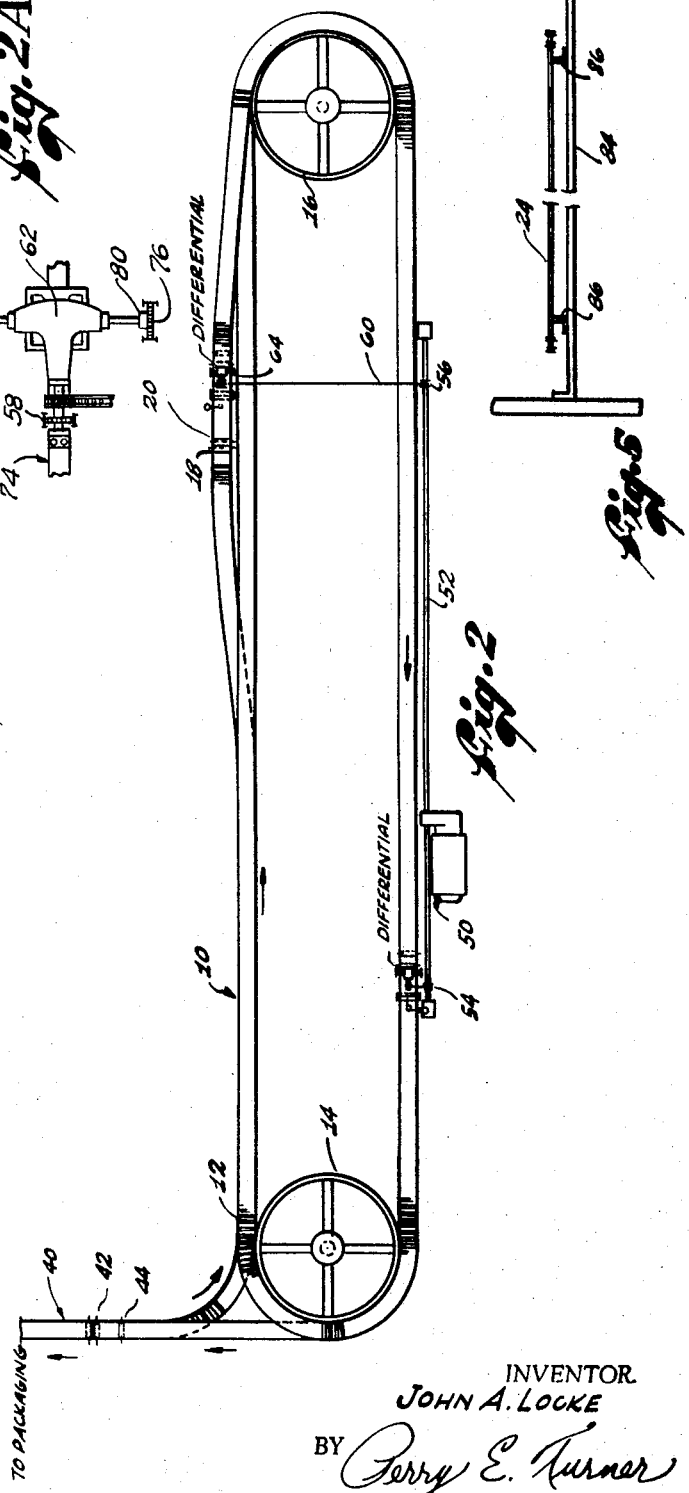
INVENTOR.
JOHN A. LOCKE
BY Perry E. Turner
ATTORNEY

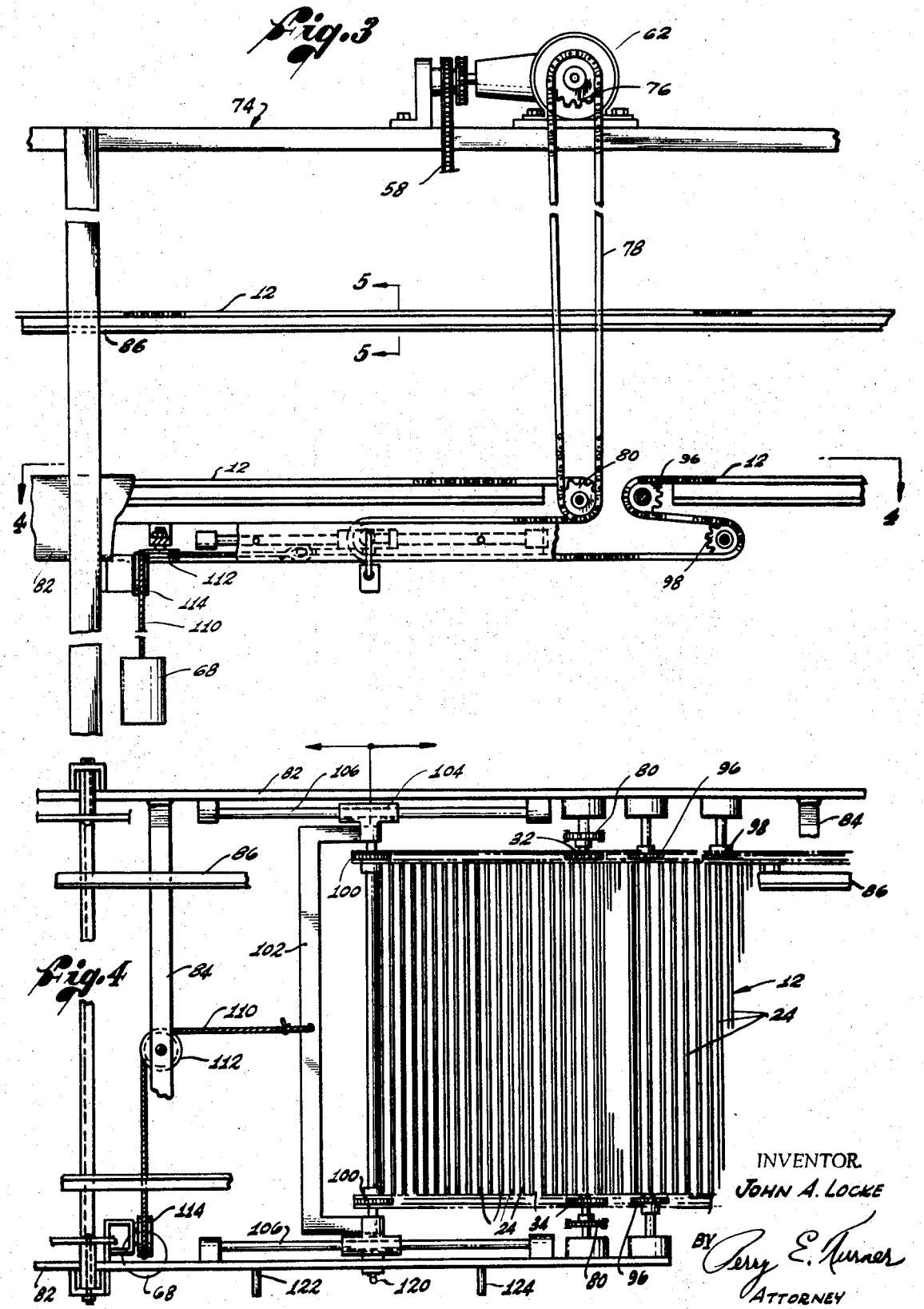

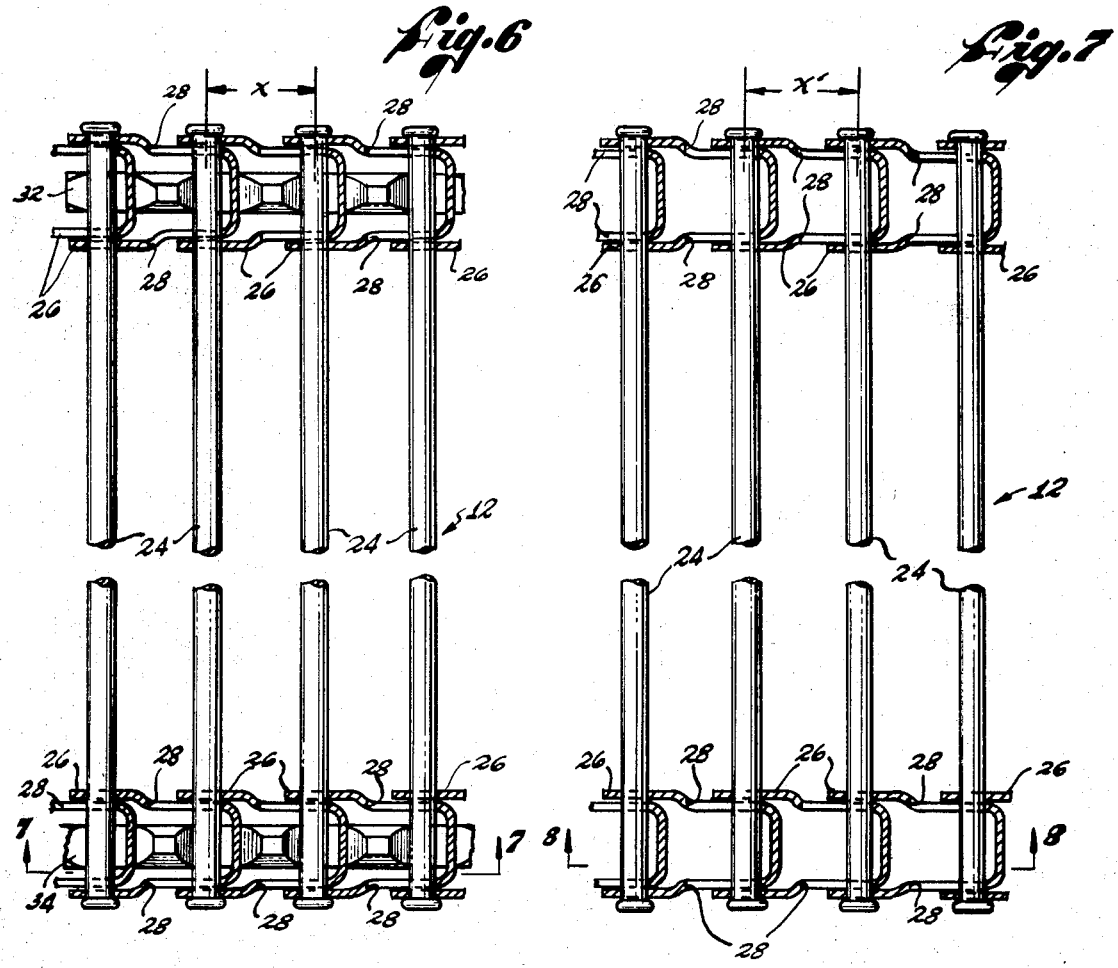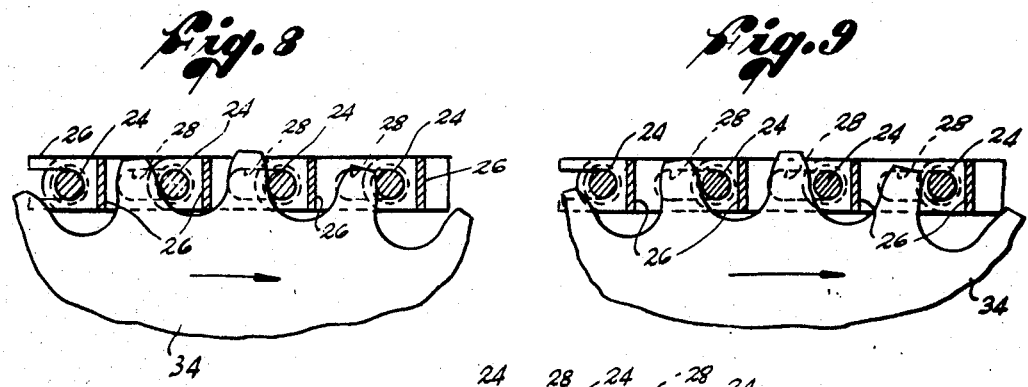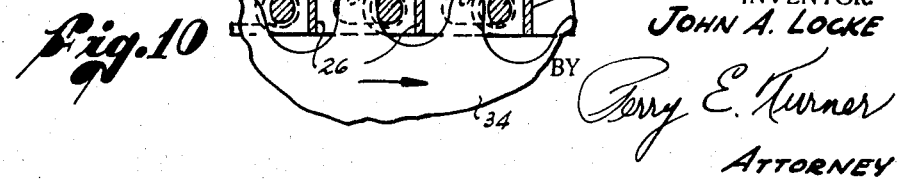

INVENTOR.
JOHN A. LOCKE
BY Perry E. Turner
ATTORNEY 3,536,183

CHAIN BELT CONVEYOR SYSTEM

BACKGROUND OF THE INVENTION

1. Field of the Invention

This invention relates to conveyor systems, and more particularly to such systems employing chain belts that are driven at their edges.

2. Description of the Prior Art

Chain belts have been developed wherein links are formed of rods which are adapted to be engaged at their ends by sprockets. The sprockets are mounted on the ends of a shaft that is adapted to be driven by a motor. Such conveyors are adapted to move items which are of sufficient size to span a number of the links.

Heretofore, conveyors of this type have had to be shut down frequently, and have necessitated considerable expenditure of time, labor and expense in maintenance, all of which has resulted in inefficiency and drastic curtailment of volume production in plant operations. In this connection, the end portions of the links engaged by the sprockets, as well as the sprockets, become worn and sections of the belt become stretched. Occasionally, an excessively worn and stretched section of the belt is replaced with a new section. This means that the belt is made up of both new and old sections, and hence there are different portions of the belt in which the number of links passing a given point (the sprockets) in a given period of time are different. For the new section, there is little or no "play" as sprocket teeth pass between the ends of adjacent links. However, when the following older section passes the sprockets, there is relatively considerable play in this regard. Accordingly, the belt is made of portions which are taut and other portions which are relatively slack. Variations in slack also occur, of course, in accordance with differing weights of articles on different portions of the belt. In prior art drive mechanisms wherein the drive sprockets rotate at the same speed, the belt moves unevenly, occasionally "bunches up", and frequently overloads the drive motor. The conveyor thus stalls and must be shut down while the fault is corrected, e.g., by taking out a number of links, replacing a burned out drive motor, or replacing damaged sprockets.

SUMMARY OF THE INVENTION

The invention comprises respective sprocket means for driving the opposite edges of a belt, and a differential for coupling the sprockets to a drive motor. Additionally, floating idler sprockets are associated with the drive sprockets, and are coupled to a weight.

By operating the driving sprockets through a differential, I insure that, regardless of the differences in amount of wear between the edges of and between different sections of a belt, sprocket speed is automatically adjusted to keep the chain moving smoothly. Thus, for example, if a section of chain starting over the sprockets is one in which there is relatively considerable wear compared to the section preceding it, one sprocket tooth normally engages one end of the first link of such following section before the other end of the link is engaged by a tooth of the other sprocket. In all such events, due to the action of the differential, the sprocket speeds are relatively adjusted to permit both ends of a link to be engaged at the same time by respective teeth, whereby each section and each portion of each section of chain is moved forwardly smoothly. Since the sprockets are mounted on separate shafts, and since the differential gearing insures that the applied power is equally divided between such shafts and their belt engaging sprockets, the differing loads constituted by variations in chain wear are effectively averaged by the differential to prevent uneven chain motion. Accordingly, since my invention automatically compensates for the various factors heretofore mentioned which have caused conveyor shutdown, my invention insures the operation of a chain belt conveyor in such a manner as to eliminate a considerable amount of time, effort and expense heretofore required for maintenance purposes, and increases volume production in plant operations.

A number of differential drives in accordance with my invention may be provided for a given conveyor system. The number of such drives will depend upon the length of conveyor chain that is to be moved.

Further, by providing adjustable tensioning, via the weight and movable idler sprockets at each drive point, I minimize the effects of variations in longitudinal stretch of and in loads carried by the chain, and hence compensate for the resulting variations in slack.

BRIEF DESCRIPTION OF THE DRAWINGS

FIG. 1 is a schematic side elevation view of a conveyor system having drive means and tension compensating means in accordance with my invention;

FIG. 2 is a schematic top plan view of the conveyor system of FIG. 1;

FIG. 2A is a top plan view of one of the differentials, showing the separate output shafts to be adjusted in operation to accommodate for the effects of wear variations so as to drive the belt edges smoothly;

FIG. 3 is a fragmentary side elevation view of the conveyor system, partly in section, showing the interconnections from the differential to the drive sprockets, and showing my arrangement of associated movable sprockets and tension compensating means;

FIG. 4 is a plan view taken along the line 4–4 of FIG. 3;

FIG. 5 is a sectional view taken along the line 5–5 of FIG. 3;

FIGS. 6 and 7 are respective fragmentary top plan views of sections of new and old chain;

FIGS. 8 and 9 are respective fragmentary sectional views taken along the lines 7–7 of FIG. 5 and 8–8 of FIG. 6, to aid in explaining the effects of varying spacings between the links of sections of newer and older chain;

FIG. 10 is a fragmentary sectional view similar to FIGS. 8 and 9 to aid in explaining the effects of extreme wear on the portions of the links engaged by sprocket teeth;

DESCRIPTION OF THE PREFERRED EMBODIMENT

Figure 11:
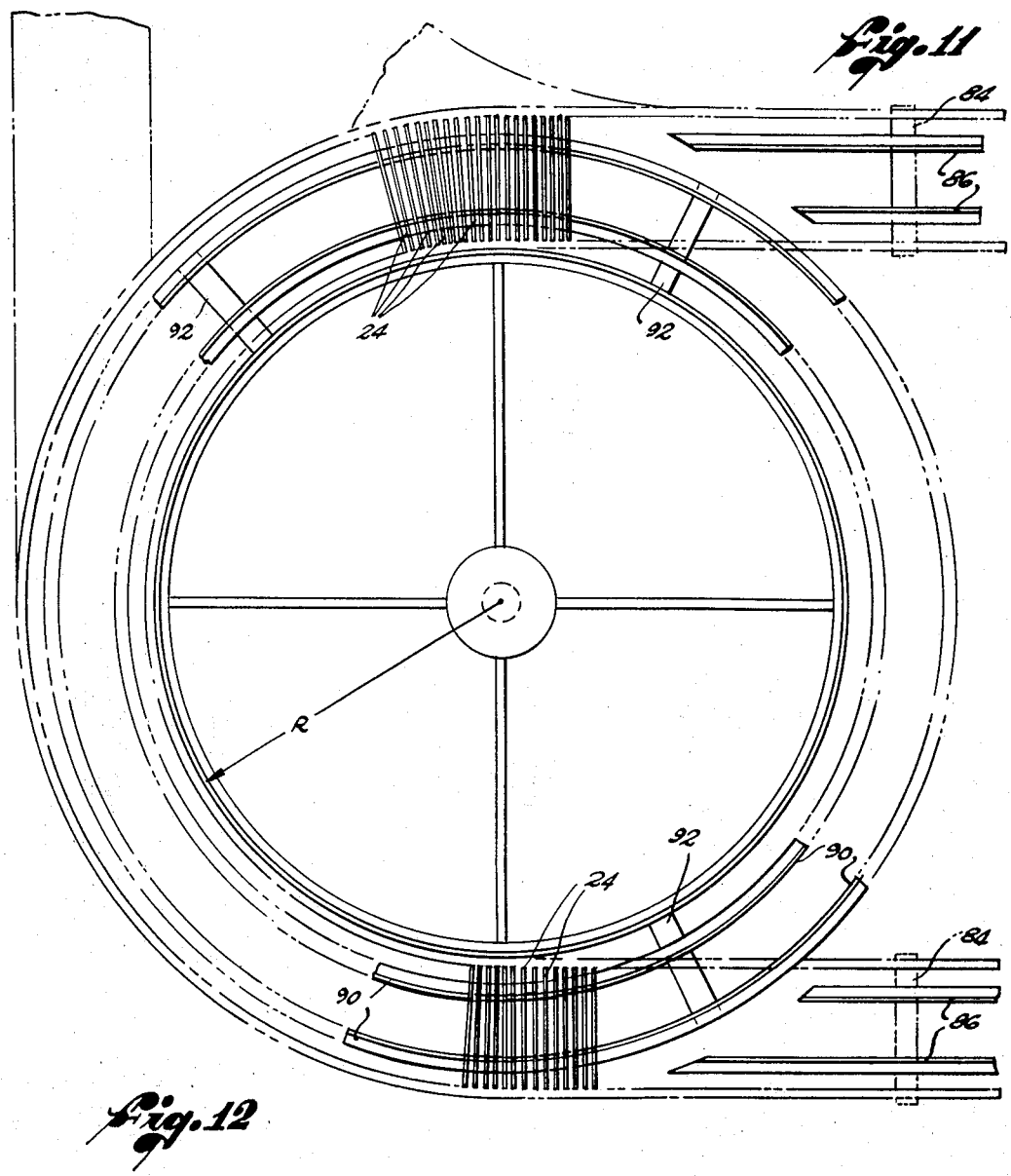
FIG. 11 is an enlargement of the portion of the conveyor in FIG. 2 in the vicinity of the left-hand drum.

Referring to FIGS. 1 and 2, a conveyor 10 is shown in which a length of chain belt 12 extends between and around a pair of spaced drums 14, 16 extending from a higher level, where articles are placed on the belt, to a lower level from which articles are removed. Thus, in a bakery, for example, freshly baked pastries placed in boxes at the top of the conveyor are allowed to cool while moving to a takeoff conveyor, from which they may be taken and placed in a cold storage room while awaiting shipment to grocery stores at distant points.

The belt is formed as a continuous loop, and to this end the uppermost and lowermost portions of the belt are angled to one side of the conveyor and outwardly of the outer edges of the intervening loops, and extends around vertically spaced sprocket pairs 18, 20 in which the teeth of the sprockets extend between the links forming the chain belt. In this connection, and referring to FIGS. 6 and 7, each link of the belt is formed of a rod 24 which is flattened at its ends. At each of its ends, each rod 24 extends through aligned openings near the ends of the legs of a generally U-shaped element 26. The elements 26 are shaped as for nesting, so that the closed end of such an element fits between the outer ends of the legs of an adjacent element 26.

The legs of the elements 26 adjacent their closed ends are slotted, as indicated at 28, and the rods 24 extend through such slots. Such slots are elongated, whereby adjacent rods 24 are adapted for movement toward and away from each other. Such a chain is taut when the rods 24 abut the portions of the elements 26 at the ends of the slots 28 nearest the closed ends of the elements 26. The chain is shortened, of course, whenever the rods 24 are positioned elsewhere along the slots 28. The rods are closest together, when the rods abut the portions of the elements 26 at the outer ends of the slots 28.

As is well known, movement of such chain is effected by sprockets, wherein the sprocket teeth pass into the space between each rod 24 and the closed end of the element 26 through which the adjacent rod passes. In FIG. 6, driving sprockets 32, 34 are shown wherein the sprocket teeth engage the rods 24 to propel the chain 12 to the right. This is best seen in FIG. 8, wherein the right-hand faces of the teeth of the sprocket 34 are in engagement with the rods 24, and wherein the sprocket 34 is shown to be rotating clockwise so as to propel the rods 24 to the right.

Sprockets 18, 20 (FIG. 1) are not driving sprockets, but the teeth of such sprockets similarly engage the chain 12. Such sprockets are actually guide elements driven by the chain. In this connection, and referring to FIG. 7, such sprockets would be engaged by the closed ends of the elements 26.

Sprockets are also shown to facilitate movement of articles off of the conveyor. Referring to the left end of FIG. 2, a portion of the chain 12 is shown extending along a tangent away from the drum 14 towards a section of a takeoff conveyor 40. The chain 12 extends around sprockets 42 and down and around sprockets 44, and thence back into a tangential path between the drums 14, 16. Thus, articles nearing the bottom portion of the conveyor are passed onto the takeoff conveyor.

By virtue of the construction of the chain belt as above described, the rods 24 are adapted to undergo relative movement to facilitate movement of the chain through curved paths, i.e., around the drums 14, 16. This is best seen in FIGS. 11—14. The chain is taut as it passes between the drums. The rods 24, the elements 26 and slots 28 therein, and the drum 14, are dimensioned so that the closed ends of the elements 26 can undergo angular movement relative to the rods 24 through the slots 28 therein. Thus, the ends of the rods nearest the drum 14 move close together (FIG. 14), i.e., the inner edge of the belt shortens, while the outer edge of the belt remains taut (FIG. 12). Further, the dimensions of these various parts are such that each rod is on an extension of a radius of the drum while the rod is passing around the drum.

FIGS. 1 and 2 illustrate my unique drive and tension compensating means for the conveyor, and FIGS. 2A, 3 and 4 further illustrate the details thereof. Referring to FIGS. 1 and 2, there is shown a motor 50 and a line shaft 52 driven thereby. At spaced points on the line shaft are sprockets 54, 56 of respective chain and sprocket drive mechanisms 58, 60 to the inputs of respective differentials 62, 64, which may be conventional differential gears such as those used in automobiles. Each differential is adapted to operate respective drive sprockets 32, 34 (FIGS. 6 and 8) via chain and sprocket drives from the outputs of the differential. In FIG. 1, the differentials 62, 64 are shown mounted above the conveyor 10, and are adapted to operate belt drive sprockets that are located at different places along the conveyor. Further, the portions of chain passing around the belt drive sprockets also extend around movable sprockets which are coupled to weights, indicated at 68, 70 in FIG. 1.

FIGS. 2A, 3 and 4 illustrate these constructions more clearly. The differential 62 and associated parts are shown in FIGS. 2A, 3. However, it will be understood that each differential and its associated parts operate in the same way. As shown in FIGS. 2A and 3, the differential 62 is mounted on the top of a frame 74. Each shaft of the differential 62 is provided with a sprocket 76, from which respective chains 78 extend downwardly and around sprockets 80 which are journaled for rotation in side bars 82 of the frame. As shown in FIG. 4, the drive sprockets 32, 34 are carried on the inner ends of the shafts on which the sprockets 80 are mounted.

At this point, mention is made of the means for supporting the belt 12 as it moves along the conveyor. Referring to FIGS. 3—5, flat bars 84 are spaced at intervals along the conveyor, with their ends secured in the sides of the frame. Extending longitudinally of the conveyor, and secured to the bars 84, are rails 86. As shown in FIG. 5, the rails 86 in cross section are in the form of angle elements. Further, the elements 86 are spaced inwardly of the outer ends of the rods 24, and such rods ride on the upstanding ribs of the elements 86. In this manner, the belt is prevented from sagging at any point along the conveyor.

Figure 12:
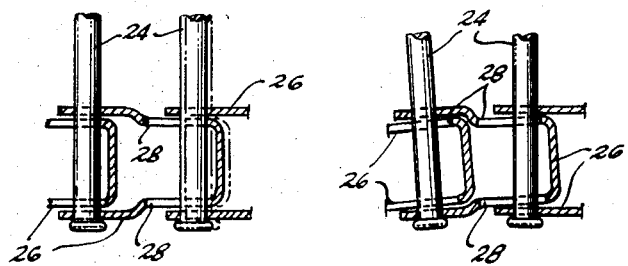
FIGS. 12 and 13 are fragmentary plan views, partly in section, of the outer and inner ends of adjacent links as the chain passes around the drum.
Figure 14:
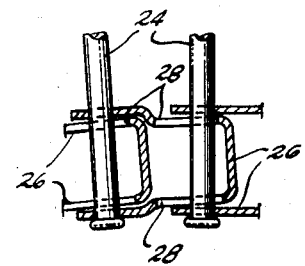
FIG. 14 is an end view of the adjacent links of FIG. 12.
Figure 13:
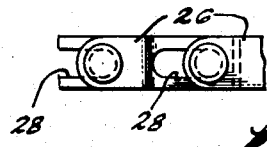

Further in this connection, and referring to FIG. 11, the drums 14, 16 carry similar rails 90, which are secured to spaced bars 92 that extend from the drums. The rails 86 terminate adjacent the outer rail 90. Thus, chain moving along the rails 86 toward the drum (at the lower portion of FIG. 11) pass onto the rails 90 in moving around the drum 14, and pass off such rails 90 and onto the rails 86 (at the top of FIG. 11) as they leave the drum.

Referring again to FIGS. 3 and 4, the belt 12 at each edge passes around vertically displaced idler sprockets 96, 98 which are journaled for rotation in the sides of the frame. From the lower sprockets 98, the belt passes around coaxial sprockets 100 which are journaled for rotation in the ends of a bar 102 that is supported at 104 for sliding movement along parallel rods 106. The ends of the rods 106 are suitably fixed to the sides of the frame. From the sprockets 100, the belt passes back and around the driving sprockets 32, 34, and thence along the rails 86.

The weight 68 is connected to the slidable bar 102, as by means of a flexible cord 110. In this connection, the weight is adapted to hang clear of the conveyor, and out of the path of articles on the belt. To this end the cord 110 is adapted to pass around suitably positioned pulleys 112, 114.

The above-described arrangement is one in which the weight 68 is adapted to move up and down in accordance with the variations in length of the belt 12. My arrangement also includes means for automatically shutting down the conveyor in the event the slack in the belt exceeds desired limits. To this end, and referring to FIG. 4, I provide a switch 120 that is carried by one of the sleeves 104 that slides on one of the rods 106. Further, I provide fixed stops 122, 124 intermediate the ends of the associated rod 106. The switch 120 is adapted for connection in circuit with the power supply for the drive motor 50 (FIG. 1), and is normally closed.

Between the limits of the fixed contacts 122, 124, the weight 68 functions as a tension compensating means to aid in taking slack out of the belt 12. However, should the belt become so elongated that the weight moves to a position where the switch 120 engages one of the stops 122, 124, the switch opens to cut off power to the motor, whereby the conveyor automatically shuts down. This could occur where a section of belt has become too worn and needs to be replaced. Similarly, links in a portion of the belt could become bunched up, as by being impeded from moving in the normal manner, e.g., by an article getting wedged between a link and a portion of the frame. In such case, the weight is caused to move up, as though the belt is shortening, and the movable switch 120 is carried against the stop opposite that toward which it moved as the belt lengthens.

To further aid in understanding how the differential drive functions in my invention, reference is made to FIGS. 6—10. FIGS. 6 and 8 represent part of a new belt section. For such section, three teeth of the driving sprockets are shown simultaneously engaging the rods of respective links. This illustrates the closeness of spacing of the links when the belt is taut.

FIGS. 7 and 9 illustrate a section of older belt. Due to wear of the portions of the slots 28 by the rods, the slots become elongated. Ultimately this elongation is such that there is a pronounced increase in spacing between adjacent links. As illustrated in FIG. 9, this circumstance gives rise to considerable play between the sprocket teeth and the portions of the links into which the teeth extend. In FIG. 9, this is reflected in that only one rod at a time is engaged by a tooth of the driving sprocket.

FIG. 10 illustrates an extreme condition of wear of the rods 24. In such case the slots 28 are also elongated, of course, and there is thus even greater play than where only the slots are elongated.

In prior art conveyors of this type, the drive sprockets are mounted on a common shaft. Accordingly, as an elongated or stretched belt section moves over the drive sprockets, the belt effectively slows down. In this latter connection, where the shaft and sprockets thereon are rotating at a constant speed, and the links are spaced farther apart, the sprocket teeth do not engage the links as soon as they do where the links are closer together as in a new belt section. Accordingly, the links of an older belt section are not given the same force to move the belt at the same speed as a section with relatively closely spaced links. Additionally, differences in wear of the drive sprockets and the ends of the rods may cause the belt edges to move unevenly and subject these parts to greater wear and damage. Thus, one sprocket may be the first to engage each of a succession of links at one edge of the belt, with the result that the sprockets and links are subject to uneven driving loads and consequent weakening of sprocket teeth and uneven belt movement.

In my invention, however, the differential automatically corrects for such differences in wear in belt sections and edges. As soon as a stretched belt section reaches the drive sprockets, the differential outputs accelerate, whereupon the teeth of the driving sprockets are caused to engage the links as quickly as they engaged the more closely spaced links of the preceding belt section. Also, where a tooth of one sprocket engages one end of a link before a tooth on the other sprocket engages the other end of the link, the differential gearing immediately permits such other sprocket to move forward, relative to the one sprocket, to cause a tooth thereof to engage the other end of the link, whereupon both ends of the link are moved forward simultaneously.

For a very short conveyor, one drive combination as above described is sufficient. However, for a very long conveyor, e.g., 1,000 feet, it is advantageous to provide a number of such drives, e.g., one for each 250 feet of belt. All such drives operate at the same speed, and the load distribution made possible thereby insures continuous, even flow or movement of the entire conveyor belt.

I claim:
1. In combination:
   an endless flat conveyor chain belt formed of rods linked at their ends;
   belt driving elements including coaxial sprockets for driving engagement with the ends of the rods; and
   a device having an input shaft, a pair of output shafts, and a differential gear coupling said input shaft to said output shafts;
   each sprocket being coupled to a respective one of said output shafts; and
   said differential gear permitting the relative speeds of said output shafts to adjust to cause the sprockets to engage and move the rod ends together.
2. The combination of claim 1, wherein:
   said sprockets are mounted on respective stub shafts secured against lateral movement, said shafts being coaxial; and
   respective chain and sprocket drive connections from said output shafts to said sprockets.
3. The combination of claim 2, including a pair of sprockets on the ends of a single shaft which is parallel to said stub shafts, the sprockets of said pair also engaging the edges of the belt, said single shaft being adapted for lateral movement parallel to said stub shafts; and a weight coupled to said single shaft and adapted to move vertically as said single shaft undergoes lateral movement.
4. In combination:
   an endless flat chain belt formed of rods of equal length, the ends of said rods forming the edges of the belt and being collapsibly linked together, each rod end being adapted to be individually engaged by one of the teeth of a driving sprocket, said belt having sections that are relatively elongated compared to other sections, said belt having individual rods that are characterized by uneven wear at the portions of their ends to be engaged by teeth of driving sprockets;
   a pair of spaced vertical drums, said belt extending between and around said drums between their ends, said belt having a vertical return portion intermediate said drums;
   spaced devices each having an input shaft, pair of output shafts, and a differential gear coupling said input shaft and said output shafts;
   respective pairs of coaxial driving sprockets with successive teeth adapted to engage the ends of successive rods of the belt;
   means separately coupling the output shafts of each device to the associated ones of a respective pair of sprockets;
   motor means; and
   means for simultaneously driving the input shafts of said devices from said motor means, each differential gear permitting the relative positions of its output shafts and associated sprockets to adjust to cause sprocket teeth to engage and move the rod ends together, thereby to cause said sprockets to move the belt substantially without unevenness of motion.
5. The combination of claim 4, including:
   a respective pair of sprockets on a single shaft parallel and adjacent to each pair of driving sprockets, each such single shaft being laterally movable in parallel relation to the associated driving sprockets, said belt passing around each pair of movable sprockets; and
   a respective vertically movable weight coupled to each movable shaft.
6. The combination of claim 4, including, for each pair of driving sprockets, a pair of sprockets on a laterally movable shaft, and two pairs of sprockets on shafts that are fixed against lateral movement, said movable shaft being located between the fixed shafts, said chain extending from the driving sprockets to pass around the sprockets on one fixed shaft, around the sprockets on said movable shaft, and around the sprockets on the other fixed shaft, said other fixed shaft being positioned so the belt extends therefrom on the same level as the belt passing around said driving sprockets; and a respective vertically movable weight coupled to each movable shaft.
7. The combination of claim 6, including switch means in circuit with said motor and carried by one of said movable shafts; and stop means in the path of said switch means and adapted when engaged by said switch means to cause said switch means to operate and stop said motor.
8. The combination of claim 6, including respective switches carried by said movable shafts, each switch being connected in circuit with said motor; and a respective stop element disposed in the path of each switch, each switch being operable upon engaging the associated stop element to stop said motor.